United States Patent
Mettath et al.

(10) Patent No.: US 10,400,155 B2
(45) Date of Patent: *Sep. 3, 2019

(54) INSULATING ANNULAR FLUID

(71) Applicant: M-I, L.L.C., Houston, TX (US)

(72) Inventors: Sashikumar Mettath, Houston, TX (US); Steven Young, Cypress, TX (US); Emanuel Stamatakis, Houston, TX (US); Balakrishnan Panamarathupalayam, Houston, TX (US); Changping Sui, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 636 days.

This patent is subject to a terminal disclaimer.

(21) Appl. No.: 14/414,088

(22) PCT Filed: Jul. 8, 2013

(86) PCT No.: PCT/US2013/049575
§ 371 (c)(1),
(2) Date: Jan. 9, 2015

(87) PCT Pub. No.: WO2014/011549
PCT Pub. Date: Jan. 16, 2014

(65) Prior Publication Data
US 2015/0152315 A1 Jun. 4, 2015

Related U.S. Application Data

(60) Provisional application No. 61/787,244, filed on Mar. 15, 2013, provisional application No. 61/669,463, filed on Jul. 9, 2012.

(51) Int. Cl.
*C09K 8/502* (2006.01)
*C09K 8/03* (2006.01)
*C09K 8/34* (2006.01)
*C09K 8/36* (2006.01)
*E21B 36/00* (2006.01)

(52) U.S. Cl.
CPC ........... *C09K 8/502* (2013.01); *C09K 8/03* (2013.01); *C09K 8/34* (2013.01); *C09K 8/36* (2013.01); *E21B 36/003* (2013.01)

(58) Field of Classification Search
CPC .. C09K 8/03; C09K 8/52; E21B 37/06; E21B 43/04; E21B 21/00; E21B 37/00
See application file for complete search history.

(56) References Cited

U.S. PATENT DOCUMENTS

| | | | |
|---|---|---|---|
| 3,613,792 A | 10/1971 | Hyde et al. | |
| 4,083,407 A * | 4/1978 | Griffin, Jr. | C09K 8/40 106/618 |
| 4,258,791 A | 3/1981 | Brandt et al. | |
| 4,507,213 A | 3/1985 | Daccord et al. | |
| 4,528,104 A | 7/1985 | House et al. | |
| 4,622,155 A | 11/1986 | Harris et al. | |
| 5,190,675 A | 3/1993 | Gross | |
| 5,228,524 A * | 7/1993 | Johnson | C09K 8/206 166/282 |
| 5,376,629 A * | 12/1994 | Smith | C09K 8/36 507/127 |
| 5,846,915 A | 12/1998 | Smith et al. | |
| 6,103,671 A | 8/2000 | Dobson et al. | |
| 6,511,944 B2 | 1/2003 | Taylor et al. | |
| 6,586,372 B1 | 7/2003 | Bradbury et al. | |
| 7,176,165 B2 | 2/2007 | Massam et al. | |
| 2004/0097600 A1 * | 5/2004 | Greenwood | B82Y 30/00 516/86 |
| 2004/0127366 A1 | 7/2004 | Bradbury et al. | |
| 2005/0098315 A1 * | 5/2005 | Danican | C09K 8/5045 166/281 |
| 2005/0101493 A1 | 5/2005 | Bradbury et al. | |
| 2005/0131107 A1 | 6/2005 | Okel et al. | |
| 2005/0176852 A1 | 8/2005 | Okel et al. | |
| 2005/0263037 A1 * | 12/2005 | Chatterji | C04B 20/1051 106/677 |
| 2005/0274516 A1 * | 12/2005 | Nelson | C09K 8/5045 166/276 |
| 2005/0277553 A1 | 12/2005 | Massam et al. | |
| 2006/0188651 A1 | 8/2006 | Bradbury et al. | |
| 2006/0225615 A1 | 10/2006 | Raman et al. | |
| 2006/0228632 A1 | 10/2006 | Boyer et al. | |
| 2006/0281009 A1 | 12/2006 | Boyer et al. | |
| 2007/0036977 A1 | 2/2007 | Sinclair et al. | |
| 2008/0064613 A1 | 3/2008 | Massam | |
| 2008/0067468 A1 | 3/2008 | Pickens et al. | |
| 2008/0171673 A1 | 7/2008 | Lewis et al. | |
| 2010/0009874 A1 | 1/2010 | Ballad et al. | |
| 2010/0147515 A1 | 6/2010 | Hughes et al. | |
| 2010/0224366 A1 * | 9/2010 | Lende | C04B 28/02 166/292 |
| 2010/0292386 A1 | 11/2010 | Okel | |

(Continued)

FOREIGN PATENT DOCUMENTS

| | | | |
|---|---|---|---|
| WO | 2006/056774 A2 | 6/2006 | |
| WO | 2009/023415 A2 | 2/2009 | |

OTHER PUBLICATIONS

International Search Report and Written Opinion for corresponding PCT Application Serial No. PCT/2013/049575, dated Nov. 18, 2013, 12 pages.

*Primary Examiner* — Alicia Bland
(74) *Attorney, Agent, or Firm* — Jeffrey D. Frantz

(57) ABSTRACT

A insulating annular fluid for reducing convective currents in the annular region a wellbore is provided that includes an oleaginous fluid, a silica, and, in some embodiments, organoclay.

19 Claims, No Drawings

(56) References Cited

U.S. PATENT DOCUMENTS

| | | | | |
|---|---|---|---|---|
| 2011/0053808 A1* | 3/2011 | Miller | ............... | C09K 8/36 |
| | | | | 507/117 |
| 2012/0048547 A1* | 3/2012 | Hughes | ............... | C09K 8/80 |
| | | | | 166/278 |
| 2012/0267112 A1* | 10/2012 | Zhang | ............... | C09K 8/516 |
| | | | | 166/308.1 |

* cited by examiner

INSULATING ANNULAR FLUID

BACKGROUND

Annular fluids or packer fluids are liquids which are pumped into annular openings such as, for example, (1) between a wellbore wall and one or more casing strings of pipe extending into a wellbore, or (2) between adjacent, concentric strings of pipe extending into a wellbore, or (3) in one or both of an A- or B-annulus in a wellbore comprising at least an A- and B-annulus with one or more inner strings of pipe extending into a said wellbore, which may be running in parallel or nominally in parallel with each other and may or may not be concentric or nominally concentric with the outer casing string, or (4) in one or more of an A-, B- or C-annulus in a wellbore comprising at least an A-, B- and C-annulus with one or more inner strings of pipe extending into a said wellbore, which may be running in parallel or nominally in parallel with each other and may or may not be concentric or nominally concentric with the outer casing string.

Yet alternatively, one or more strings of pipe may simply run through a conduit or outer pipe(s) to connect one or more wellbores to another wellbore or to lead from one or more wellbores to a centralized gathering or processing center; and said annular fluid may have been emplaced within said conduit or pipe(s) but external to said one or more strings of pipe therein. Insulating annular fluids or insulating packer fluids are annular fluids or packer fluids used to control heat loss—both conductive and convective heat losses. These insulating annular or packer fluids are used in oil or gas well construction operations conducted in low temperature venues of the world, for example, those areas having permafrost.

Permafrost is a thick layer of frozen surface ground found often in arctic or antarctic regions, which frozen ground may be several hundred feet thick and presents a great obstacle to the removal of relatively warm fluids through a well pipe penetrating said frozen ground. Particularly, warm fluid in the well pipe causes thawing of the permafrost in the vicinity of the well resulting in subsidence which can irreparably impair the permafrost environment and impose compressive and/or tension loads high enough to rupture or collapse the well casing and hence allow the escape of well fluids. In addition, the warm gas or oil coming to the surface in the well pipe becomes cooled by giving up its heat to the permafrost. Further, gas hydrate crystals may form, which can freeze together and block the well pipe; alternatively, wax or asphaltenes may form, which can agglomerate and block the well pipe. Generally, except for a tiny contribution from radiation, annular heat loss is due to convection and to conduction.

Conditions where the drill string are in contact with large bodies of water, such as deepwater operations, may also require thermal isolation of production fluids from the surrounding environment. Deepwater drilling is carried out under high bottom hole temperatures and pressures. The deepwater wells stretch to several thousand meters in depth, where the majority of the well string is in direct contact with ocean waters. Contact of the surrounding waters with the drill string may result in the rapid transfer of heat, leading to the formation of gas hydrates as described above.

Heavy oil production is another operation which often can benefit from the use of an insulating annular fluid. In heavy oil production, a high-pressure steam or hot water is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing leakage. Accordingly, an insulating medium such as a packer fluid may be used to insulate or to help insulate the well tubing. The packer fluid also reduces heat loss and saves on the energy requirements in stimulation using hot-water or steam (huff-n-puff) or in hot-water- or steam-flooding.

In addition to steam injection processes and operations which require production through a permafrost layer, subsea fields—especially, subsea fields in deep water, 1,500 to more than 6,000 feet deep—require specially designed systems, which may require an insulating annular or packer fluid. For example, a subsea oil reservoir temperature may be between about 120° F. and 250° F., while the temperature of the water through which the oil may be conveyed is often as low as 32° F. to 50° F. Conveying the high temperature oil through such a low temperature environment can result in oil temperature reduction and consequently the separation of the oils into various hydrocarbon fractions and the deposition of paraffins, waxes, asphaltenes, and gas hydrates. The agglomeration of these oil constituents can cause blocking or restriction of the wellbore, resulting in significant reduction or even catastrophic failure of the production operation.

To meet the above-discussed insulating demands, a variety of packer fluids have been developed. For example, U.S. Pat. No. 3,613,792 describes an early method of insulating wellbores. In U.S. Pat. No. 3,613,792, simple fluids and solids are used as the insulating medium. U.S. Pat. No. 4,258,791 improves on these insulating materials by disclosing an oleaginous liquid such as topped crude oils, gas oils, kerosene, diesel fluids, heavy alkylates, fractions of heavy alkylates and the like in combination with an aqueous phase, lime, and a polymeric material. U.S. Pat. No. 4,528,104 teaches a packer fluid comprised of an oleaginous liquid such as diesel oil, kerosene, fuel oil, lubricating oil fractions, heavy naphtha and the like in combination with an organophillic clay gellant and a clay dispersant such as a polar organic compound and a polyfunctional amino-silane.

Gelled hydrocarbons have been successfully used as packer fluids because the hydrocarbon fluids have low thermal conductivities, while gel formation increases the viscosities of the fluids. The increased viscosity minimizes fluid movement in packer fluids, leading to reduced or minimized convective heat loss.

Polyvalent metal (such as ferric iron or aluminum) salts of phosphoric acid esters have been successfully used as gelling agents for forming high viscosity gelled hydrocarbon fluids. Description of these fluids and their uses can be found in U.S. Pat. No. 4,507,213 issued to Daccord et al., U.S. Pat. No. 4,622,155 issued to Harris et al., U.S. Pat. No. 5,190,675 issued to Gross, and U.S. Pat. No. 5,846,915 issued to Smith et al. More recently, U.S. Pat. No. 6,511,944 issued to Taylor et al. discloses gelled hydrocarbon fracture fluids that include ferric iron or aluminum polyvalent metal salts of phosphonic acid esters, instead of phosphoric acid esters.

Typical hydraulic fracturing fluids have limited stability. Hydraulic fracturing often involves up to 2,000,000 pounds of proppant and operations may be concluded in less than 8 hours.

SUMMARY

In one aspect, embodiments disclosed herein relate to an oil-based insulating packer that includes an oleaginous fluid, a silica weighting agent, and optionally an organoclay.

In another aspect, embodiments disclosed herein relate to a method of reducing convective currents in a packer fluid, which includes preparing a packer fluid including an oleaginous fluid, a silica weighting agent, and optionally an organoclay; and pumping the packer fluid into a wellbore.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Embodiments of the present disclosure relate to insulating packer fluids and methods of preparing and emplacing such fluids. Annular or packer fluids according to the present disclosure have good long-term insulation properties, because they resist syneresis and separation of various components into separate phases, and have low thermal conductivities and unique rheological properties that minimize their movement once they are emplaced—and this minimization of movement, in turn, minimizes convective heat loss. Annular fluids of the present disclosure may also exhibit stability under elevated temperatures that may degrade annular fluids containing only polymeric viscosifiers.

A majority of annular heat loss is due to convection and conduction. Heat loss due to thermal conductivity may be controlled by proper selection of fluids, i.e. fluids with low thermal conductivities, while heat loss due to convection can be arrested or substantially diminished by increasing the viscosity of the selected fluid. For example, thermal conductivities as low as 0.07 btu/(hr·ft·° F.) can be obtained with gelled diesel or other hydrocarbon-based insulating annular fluids.

In certain aspects, disclosed embodiments relate to insulating silica-containing packer fluids, and methods of emplacing and subsequently removing such fluids. Packer fluids according to embodiments disclosed herein may have relatively high densities, and may be adapted to survive in high temperature and/or high pressure wells.

More specifically, insulating packer fluids in accordance with disclosed embodiments are oil-based (hydrocarbon-based) fluids, which may include fumed or precipitated silicas and organophilic clays, and may possess low thermal conductivities, increased viscosity, and high stability under elevated temperatures.

Silica Weighting Agents

Silica weighting agents in accordance with embodiments of the present disclosure may be used as a weighting agent that may also increase the viscosity of the wellbore fluid. Silicas have been used in wellbore fluids as weighting agents, consolidating treatments, proppants, desiccants, and additives for rubber compositions. The methods used to prepare silicas may alter many of the morphological characteristics of the final silica product.

For example, fumed or pyrogenic silicas useful in embodiments disclosed herein are produced from the vapor phase hydrolysis of chlorosilanes, such as silicon tetrachloride, in a hydrogen oxygen flame are non-porous, water-soluble, have low bulk density, and high surface area. Due to the hydrogen bonding of the surface silanol groups present on the silica particles, fumed silicas also impart unique rheological properties, such as increased viscosity and shear-thinning behavior, when added to fluid systems and may be used as additives for aqueous and invert emulsion fluid systems.

Another form of silica useful in embodiments of the present disclosure useful as a viscosifying or weighting agent are precipitated silicas, such as those prepared from the reaction of an alkaline silicate solution with a mineral acid. Precipitated silicas may have a porous structure, and may be selected, for example, from one or more of sodium silicate, potassium silicate, lithium silicate and quaternary ammonium silicates. Precipitated silicas may be produced by the destabilization and precipitation of silica from soluble silicates by the addition of a mineral acid and/or acidic gases. The reactants thus include an alkali metal silicate and a mineral acid, such as sulfuric acid, or an acidulating agent, such as carbon dioxide. Precipitation may be carried out under alkaline conditions, for example, by the addition of a mineral acid and an alkaline silicate solution to water with constant agitation. The choice of agitation, duration of precipitation, the addition rate of reactants, temperature, concentration, and pH may vary the properties of the resulting silica particles.

Silicas useful in embodiments herein may include finely-divided particulate solid materials, such as powders, silts, or sands, as well as reinforced flocs or agglomerates of smaller particles of siliceous material. In some embodiments, silica particles (or agglomerates thereof) may have an average particle size ($D_{50}$) of less than 100 microns; less than 50 microns in other embodiments; and in the range from about 1 micron to about 40 microns, such as about 25 to about 35 microns, in yet other embodiments. In some embodiments, silicas having a larger initial average particle size may be used, where shear or other conditions may result in comminution of the particles, such as breaking up of agglomerates, resulting in a silica particle having a useful average particle size.

Precipitated silicas may contain varying amounts of residual alkali metal salts that result from the association of the corresponding silicate counterion with available anions contributed by the acid source. Residual salts may have the basic formula MX, where M is a group 1 alkali metal selected from Li, Na, K, Cs, a group 2 metal selected from Mg, Ca, and Ba, or organic cations such as ammonium, tetraalkyl ammonium, imidazolium, alkyl imidazolium, and the like; and X is an anion selected from halides such as F, Cl, Br, I, and/or sulfates, sulfonates, phosphonates, perchlorates, borates, and nitrates. In embodiments, the residual salts may be selected from one or more of $Na_2SO_4$ and NaCl, and the precipitated silica may have a residual salt content (equivalent Na2SO4) of less than about 2 wt. %. While the pH of the resulting precipitated silicas may vary, embodiments of the silicas useful in embodiments disclosed herein may have a pH in the range from about 6.5 to about 9, such as in the range from about 6.8 to about 8.

In other embodiments, surface-modified fumed and precipitated silicas may be used. The surface-modified silicas may include a lipophilic coating, for example. In some embodiments, the surface modification may be added to the silica after precipitation. Alternatively, the silica may be precipitated in the presence of one or more of the surface modification agents described below.

It has been found that surface-modified precipitated silicas according to embodiments herein may provide for both weighting and viscosifying of the oleaginous base fluid. Fumed or precipitated silicas according to embodiments herein are useful for providing wellbore fluids having enhanced thermal stability in temperature extremes, while exhibiting a substantially constant rheological profile over time.

In some embodiments, the surface of the silica particles may be chemically modified by a number of synthetic techniques. Surface functionality of the particles may be tailored to improve solubility, dispersibility, or introduce reactive functional groups. This may be achieved by reacting the silica particles with organosilanes or siloxanes, in which reactive silane groups present on the molecule may become covalently bound to the silica lattice that makes up the particles. Non-limiting examples of compounds that may be used to functionalize the surface of the silica particles include aminoalkylsilanes such as aminopropyltriethoxysilane, aminomethyltriethoxysilane, trimethoxy[3-(phenylamino)propyl]silane, and trimethyl[3-(triethoxysilyl)propyl]ammonium chloride; alkoxyorganomercapto silanes such as bis(3-(triethoxysilylpropyl) tetrasulfide, bis(3-(triethoxysilylpropyl) disulfide, vinyltrimethoxy silane, vinyltriethoxy silane, 3-mercaptopropyltrimethoxy silane; 3-mercaptopropyltriethoxy silane; 3-aminopropyltriethoxysilane and 3-aminopropyltrimethoxysilane; and alkoxysilanes.

In other embodiments, organo-silicon materials that contain reactive end groups may be covalently linked to the surface of the silica particles. Reactive polysiloxanes may include, for example, diethyl dichlorosilane, phenyl ethyl diethoxy silane, methyl phenyl dichlorosilane, 3,3,3-trifluoropropylmethyl dichlorosilane, trimethylbutoxy silane, sym-diphenyltetramethyl disiloxane, octamethyl trisiloxane, octamethyl cyclotetrasiloxane, hexamethyl disiloxane, pentamethyl dichlorosilane, trimethyl chlorosilane, trimethyl methoxysilane, trimethyl ethoxysilane, methyl trichlorosilane, methyl triethoxysilane, methyl trimethoxysilane, hexamethyl cyclotrisiloxane, hexamethyldisiloxane, hexaethyldisiloxane, dimethyl dichlorosilane, dimethyl dimethoxy silane, dimethyl diethoxysilane, polydimethylsiloxanes comprising 3 to 200 dimethylsiloxy units, trimethyl siloxy or hydroxydimethylsiloxy end blocked poly(dimethylsiloxane) polymers (silicone oils) having an apparent viscosity within the range of from 1 to 1000 mPascals at 25° C., vinyl silane, gamm-methacryloxypropyl trimethoxy silane, polysiloxanes, e.g., polysiloxane spheres, and mixtures of such organo-silicone materials.

The surface-modified fumed or precipitated silicas may have a BET-5 nitrogen surface area of less than about 200 $m^2/g$. In some embodiments, the surface area of the surface-modified silica may be less than about 150 $m^2/g$. In other embodiments, the surface area may be in the range from about 20 $m^2/g$ to about 70 $m^2/g$.

In one or more embodiments, the silica has a BET-5 nitrogen surface area of 20 $m^2/g$ to 70 $m^2/g$, as calculated from the surface adsorption of $N_2$ using the BET-1 point method, a pH in the range of pH 7.5 to pH 9, and an average particle diameter in the range of 20 nm to 100 nm.

In some embodiments, precipitated silicas useful in embodiments herein may include those as disclosed in U.S. Patent Application Publication Nos. 2010/0292386, 2008/0067468, 2005/0131107, 2005/0176852, 2006/0225615, 2006/0228632, and 2006/0281009, for example.

In embodiments, silica weighting agents may be added to the wellbore fluids of the present disclosure at a concentration of 5 ppb to 40 ppb. In other embodiments of the present disclosure, silica weighting agents may be added at least 10 wt.

It is also within the scope of the present disclosure, which may allow for reduced wt % of both the fumed silica particles and the precipitated silica particles.

Viscosifiers

In one or more embodiments of the present disclosure, oleaginous or oil-based wellbore fluids may be formulated with organophilic clay viscosifiers or gellants that adjust the viscosity and desired rheological properties of the fluid. In addition, the inclusion of a clay gellant into the oil-based annular fluid formulation may provide for desired suspension properties and increase the stability of the silica weighting agents over the duration of the downhole operation.

Organophilic clay viscosifiers may include LAPONITE® and other small fibrous clays such as the polygorskites (attapulgite and sepiolite). Other organophilic clay additives may include viscosity modifiers BENTONE®150, TRU-VIS™, GARAMITE®1210, VG SUPREME™, and LAPONITE®, which are available from M-I L.L.C. (Houston, Tex.).

Attapulgite (or other non-hydratable clays such as sepiolite) may be dispersed in oleaginous-based wellbore fluids or may form colloids which are stable in other fluids such as high electrolyte solutions such as seawater. Attapulgite is a hydrous magnesium aluminosilica which is approximately spherical as opposed to the layered structure of smectite clays such as bentonite. This structure results in viscosification without hydration. Rather, viscosification of an attapulgite slurry results from shearing that elongates the clay particles into more of a needle or lathe shape, which is how this clay may be described in the literature. When suspended in liquid, these lathes bunch together into bundles that have a haystack appearance under an electron microscope. This clay does not swell when contacted with water, so its ability to build viscosity depends upon the extent on which the colloid is sheared.

In embodiments, the wellbore fluids disclosed herein may contain a non-hydratable clay, such as a clay having a needle-like or chain-like structure that results in viscosification through shearing. In various other embodiments, the non-hydratable clay may be selected from at least one of attapulgite and sepiolite clays. While the non-hydratable clays do not substantially swell in either fresh or salt water, they may still operate to thicken salt solutions. This thickening may be attributed to what is believed to be a unique orientation of charged colloidal clay particles in the dispersion medium.

In further embodiments, the drilling fluids disclosed herein may be substantially free of hydrating clays. As used herein, "hydrating clays" is defined as those clays which swell appreciably (i.e., increase their volume by an amount of at least about 8 times) in either fresh water or salt water, and "substantially free" is defined as an amount that does not significantly affect dispersibility. Hydrating clays may include those clays which swell appreciably in contact with fresh water, but not when in contact with salt water, include, for example, clays containing sodium montmorillonite, such as bentonite. As described above, many hydrating clays have a sheet- or plate-like structure, which results in their expansion upon contact with water.

The use of attapulgite and sepiolite (or other non-hydratable clays) is known in the art. For example, such clays are frequently used in place of bentonite as a "spud mud" to drill a top section of an offshore well, when a brine or other salt-containing water is used as the continuous phase of the wellbore fluid to which the clay is added. Further, as described above, the viscosification of such fluid formulations is achieved by shearing of the fluid so that aggregates of the clay particles are dispersed into individual (or smaller bundles) of needle-like particles, which in turn form random lattices capable of trapping water molecules. It is also believed that shearing may also break the edges of the crystal, creating attractive forces at the charges on the resulting broken bonds, which in turn attract water. However, shearing requires considerable time and energy on a rig for the fluid to reach the desired viscosity.

Because mud pump rates (on a rig) are faster than the time required for sufficient levels of shearing, higher concentrations of clay may be used to ensure the required viscosity is reached. The inventors of the present application, however, have advantageously discovered that attapulgite (or other non-hydratable clays) of smaller particle size than conventional, commercial products may be dispersed more quickly, enabling viscosity (the yield) to be reached faster and with less shearing energy, without significant increases in plastic viscosity. While not being bound by any particular mechanism, it is proposed that when a fluid is sheared, the clay particles are being effectively milled. Thus, it is theorized that by using a source of finer clay particles, the effective milling during the shearing may be reduced (or eliminated) and, the fluid may reach its yield point more quickly. Additionally, by using sized particles that decrease the amount of time for the fluid to yield, the yield point may be reached by shearing at times amounts that are comparable to mud pump rates, thus allowing lower concentrations of clay to be used while obtaining better performance.

Thus, in accordance with embodiments of the present disclosure, the use of sized or micronized non-hydratable clay may be provided in a wellbore fluid formulation. The inventors of the present disclosure took particle size distributions of various samples of conventional attapulgite clay and determined that sources ranged in average size (i.e., $d_{50}$ of 64 to 161 microns); however, it is be noted that such size determination/selection is not readily a consideration that is made when incorporating attapulgite into a wellbore fluid formulation. As used herein, the term "sized clay" refers to clay aggregates that have been classified by size into a desired $d_{50}$ range. Unless otherwise noted, all particle size ranges refer to pre-shear values. For example, using classification equipment, a clay source may be classified by size to separate clay agreements that have an average particle size of less than 50 microns prior to their incorporation in a wellbore fluid and being subjected to any shearing. Thus, in various embodiments, a sized non-hydratable clay of the present disclosure may have a $d_{50}$ less than about 50 microns, less than about 20 microns in another embodiment, and less than about 10 microns in yet another embodiment.

One of ordinary skill in the art would appreciate that selection of a particle size distribution (i.e., from a $d_{50}$ less than 50, 40, 30, 20, 10 micron, for example, or any other $d_{50}$ value) may depend on factors such as the type (and accuracy) of shear equipment available, clay concentration, mud pump rates, the yield point desired, etc. For example, it may be determined that not only could reduced shearing times be achieved through the use of size non-hydratable clays, but that an increased yield point could be achieved through the use of such sized non-hydratable clays. Thus, if a particular yield point is desired, and a particular type of equipment having slightly lower shear rates may be used, a combination of slightly finer clay particles at lower concentrations or slightly larger particles at higher concentrations may be selected therefrom.

Further, one of ordinary skill in the art will appreciate that while a $d_{50}$<50 or 20 micron size ranges may be desirable for certain formulations, other size ranges (and distributions) may also be used in the fluids and methods of the present disclosure. Thus, examples of alternate size distributions may include non-hydratable clays having a $d_{10}$<9 microns, $d_{25}$<26 microns, and $d_{50}$<64 microns. Other embodiments may include non-hydratable clay materials having (before shear) a $d_{90}$ ranging from 24-68 microns, a $d_{50}$ ranging from 10-30 microns, and a $d_{10}$ ranging from 3-6 microns. Further, once these particles have been incorporated into a wellbore fluid and subjected to shear, the distribution may narrow. Thus, embodiments of the present disclosure may include non-hydratable clay materials having (after shear) a $d_{90}$ ranging from 12-24 microns, a $d_{50}$ ranging from 3.7-12 microns, and a $d_{10}$ ranging from 0.6-1.4 microns. However, those of ordinary skill in the art will realize that variations in the size of ground clay materials may vary according to the requirements of a certain wellbore fluid and/or drilling operation.

As mentioned above, the use of sized non-hydratable clays may allow for improved yield point properties. Yield point is a measurement of the electro-chemical or attractive forces under flow conditions, which indicates the ability of a wellbore fluid to carry cuttings out of the wellbore, and is thus dependent upon the surface properties of a fluid's solids. These electro-chemical or attractive forces are a result of negative and positive charges located on or near the particle surfaces, which may be generated, for example, during shearing. In accordance with embodiments of the present disclosure, use of sized non-hydratable clays may allow for yield points of at least about 50 lb/100 ft$^2$ to be achieved at concentrations of 30 ppb. Further, yield points of at least about 60 lb/100 ft$^2$ may be achieved at concentrations of 35 ppb of non-hydratable clays. Moreover, such yield points may be reached with shear times of less than 30 min when using Silverson mixer with a round hole emulsion screen stator head, which has a shear rate of 6,522,000 s$^{-1}$. Concentrations may range from 20 ppb to 50 ppb in some embodiments; however, one skilled in the art would appreciate that other concentrations may be used as the selection of concentration may be dependent on the desired yield point for a particular drilling operation.

Solid Weighting Agents

If necessary, the density of the fluid may be increased by incorporation of a solid weighting agent. Solid weighting agents used in some embodiments disclosed herein may include a variety of inorganic compounds well known to one of skill in the art. In some embodiments, the weighting agent may be selected from one or more of the materials including, for example, barium sulphate (barite), calcium carbonate (calcite or aragonite), dolomite, ilmenite, hematite or other iron ores, olivine, siderite, manganese oxide, and strontium sulphate. In a particular embodiment, calcium carbonate or another acid soluble solid weighting agent may be used.

One having ordinary skill in the art would recognize that selection of a particular material may depend largely on the density of the material because generally the lowest wellbore fluid viscosity at any particular density is obtained by using the highest density particles. In some embodiments, the weighting agent may be formed of particles that are composed of a material of specific gravity of at least 2.3; at least 2.4 in other embodiments; at least 2.5 in other embodiments; at least 2.6 in other embodiments; and at least 2.68 in yet other embodiments. Higher density weighting agents may also be used with a specific gravity of about 4.2, 4.4 or even as high as 5.2. For example, a weighting agent formed of particles having a specific gravity of at least 2.68 may allow wellbore fluids to be formulated to meet most density requirements yet have a particulate volume fraction low enough for the fluid to be pumpable. However, other considerations may influence the choice of product such as cost, local availability, the power required for grinding, and whether the residual solids or filtercake may be readily removed from the well. In particular embodiments, the wellbore fluid may be formulated with calcium carbonate or another acid-soluble material.

The solid weighting agents may be of any particle size (and particle size distribution), but some embodiments may include weighting agents having a smaller particle size range than API grade weighting agents, which may generally be referred to as micronized weighting agents. Such weighting agents may generally be in the micron (or smaller) range, including submicron particles in the nanosized range.

In some embodiments, the average particle size (d50) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Patent Application Publication No. 2010/009874, which is assigned to the present assignee and herein incorporated by reference. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one embodiment, a weighting agent is sized such that: particles having a diameter less than 1 micron are 0 to 15 percent by volume; particles having a diameter between 1 micron and 4 microns are 15 to 40 percent by volume; particles having a diameter between 4 microns and 8 microns are 15 to 30 by volume; particles having a diameter between 8 microns and 12 microns are 5 to 15 percent by volume; particles having a diameter between 12 microns and 16 microns are 3 to 7 percent by volume; particles having a diameter between 16 microns and 20 microns are 0 to 10 percent by volume; particles having a diameter greater than 20 microns are 0 to 5 percent by volume. In another embodiment, the weighting agent is sized so that the cumulative volume distribution is: less than 10 percent or the particles are less than 1 micron; less than 25 percent are in the range of 1 micron to 3 microns; less than 50 percent are in the range of 2 microns to 6 microns; less than 75 percent are in the range of 6 microns to 10 microns; and less than 90 percent are in the range of 10 microns to 24 microns.

The use of weighting agents having such size distributions has been disclosed in U.S. Patent Application Publication Nos. 2005/0277553 and 2010/0009874, which are assigned to the assignee of the current application, and herein incorporated by reference. Particles having these size distributions may be obtained any means known in the art.

In some embodiments, the weighting agents include dispersed solid colloidal particles with a weight average particle diameter (d50) of less than 10 microns that are coated with an organophilic, polymeric deflocculating agent or dispersing agent. In other embodiments, the weighting agents include dispersed solid colloidal particles with a weight average particle diameter (d50) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the inter-particle interactions and thus will produce lower rheological profiles. It is the combination of fine particle size and control of colloidal interactions that reconciles the two objectives of lower viscosity and minimal sag.

In some embodiments, the weighting agents may be uncoated. In other embodiments, the weighting agents may be coated with an organophilic coating such as a dispersant, including carboxylic acids of molecular weight of at least 150 Daltons, such as oleic acid, stearic acid, and polybasic fatty acids, alkylbenzene sulphonic acids, alkane sulphonic acids, linear alpha-olefin sulphonic acid, and alkaline earth metal salts thereof. Further examples of suitable dispersants may include a polymeric compound, such as a polyacrylate ester composed of at least one monomer selected from stearyl methacrylate, butylacrylate and acrylic acid monomers. The illustrative polymeric dispersant may have an average molecular weight from about 10,000 Daltons to about 200,000 Daltons and in another embodiment from about 17,000 Daltons to about 30,000 Daltons. One skilled in the art would recognize that other acrylate or other unsaturated carboxylic acid monomers (or esters thereof) may be used to achieve substantially the same results as disclosed herein.

In embodiments, the coated weighting agents may be formed by either a dry coating process or a wet coating process. Weighting agents suitable for use in other embodiments disclosed herein may include those disclosed in U.S. Patent Application Publication Nos. 2004/0127366, 2005/0101493, 2006/0188651, 2008/0064613, and U.S. Pat. Nos. 6,586,372 and 7,176,165, for example.

The particulate materials as described herein (i.e., the coated and/or uncoated weighting agents) may be added to a wellbore fluid as a weighting agent in a dry form or concentrated as slurry in either an aqueous medium or as an organic liquid. As is known, an organic liquid may have the environmental characteristics required for additives to oil-containing wellbore fluids. With this in mind, the oleaginous fluid may have a kinematic viscosity of less than 10 centistokes (10 mm2/s) at 40° C. and, for safety reasons, a flash point of greater than 60° C. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation. In one embodiment, the desired particle size distribution is achieved via wet milling of the coarser materials in the desired carrier fluid.

Such solid weighting agents may be particularly useful in wellbore fluids formulated with an entirely oleaginous fluid phase. In a particular embodiment, an organophilic coated weighting agent having a particle size within any of the described ranges may be used in a fluid free of or substantially free of an aqueous phase contained therein. Solid weighting agents may also be used in the direct emulsion emulsions of the present disclosure to provide additional density beyond that provided by the aqueous phase as needed.

Rheological Additives

Other additives that may be included in the wellbore fluids disclosed herein include, for example, gelling agents, wetting agents, organophilic clays, viscosifiers, surfactants, emulsifiers, dispersants, interfacial tension reducers, pH buffers, mutual solvents, thinners, thinning agents, rheological additives and cleaning agents. The addition of such agents should be well known to one of ordinary skill in the art of formulating drilling fluids and muds.

Other types of surfactants such as wetting agents may be added to enhance the stability of suspensions or emulsions in wellbore fluids. Suitable wetting agents may include fatty acids, organic phosphate esters, modified imidazolines, amidoamines, alkyl aromatic sulfates, and sulfonates. For example, SUREWET®, which is commercially available from M-I LLC, Houston, Tex., is an oil based wetting agent and secondary emulsifier that may be used to wet fines and drill solids to prevent water-wetting of solids. Moreover, SUREWET® may improve thermal stability, rheological stability, filtration control, emulsion stability of wellbore fluids. Although various wetting agents have been listed above, testing has shown that not all surface-modified silicas work with all wetting agents, and may be due to compatibility of the surface modification and the wetting agent components. SUREWET®, for example, has been shown to be effective with polysiloxane, aminoalkylsilane, and alkoxyorganomercaptosilane coatings, whereas other wetting agents tested may not exhibit similar compatibility. Accordingly, when used, the wetting agent may be selected to provide a desired interaction with the surface-modified silica.

Suitable rheological additives in accordance with embodiments of the present disclosure, for example, may include alkyl diamides, such as those having a general formula: $R_1$—NH—CO—$(CH_2)_n$—CO—NH—$R_2$, wherein n is an integer from 1 to 20 in some embodiments, 1 to 4 in some embodiments, and 1 to 2 in still another embodiment, and $R_1$ is an alkyl groups having from 1 to 20 carbons in embodiments, 4 to 12 carbons in other embodiments, and 5 to 8 carbons in still other embodiments, and $R_2$ is hydrogen or an alkyl group having from 1 to 20 carbons in some embodiments, or is hydrogen or an alkyl group having from 1 to 4 carbons in other embodiments, wherein $R_1$ and $R_2$ may or may not be identical in embodiments. Such alkyl diamides may be obtained, for example, from M-I L.L.C. (Houston, Tex.) under the trade name of VersaPac™.

Wellbore Fluid Formulation

The silicas, organophilic clays, and optionally weighting agents as described above may be combined to form an oleaginous fluid (oil-based) wellbore fluid, as outlined below. In some embodiments, the materials may be combined to form an insulating packer fluids in accordance with embodiments herein.

The oleaginous fluid may be a liquid, such as a natural or synthetic oil. For example, the oleaginous fluid may include one or more of diesel oil; mineral oil; a synthetic oil, such as hydrogenated and unhydrogenated olefins including poly-alpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof.

Conventional methods can be used to prepare the drilling fluids disclosed herein in a manner analogous to those normally used, to prepare oil-based drilling fluids. In one embodiment, a desired quantity of oleaginous fluid such as a base oil, and a suitable amount of one or more fumed or precipitated silicas are mixed together and any remaining components are added sequentially with continuous mixing.

One issue in formulating annular fluids is that oil phase separation can occur. This phenomenon is known as "top oil loss" or "top oil separation", and can be combated through the use of gelling agents. Specifically, by mixing gelling agents in with the base fluid, the oil, which would otherwise phase separate, can be gelled, preventing this phenomenon. Gelling agents may be added in an amount of 0.1% by weight up to about 5% by weight, or 0.5% by weight up to about 3.5% by weight in other embodiments, or 1% by weight up to about 2% by weight in still other embodiments.

The concentration of the oleaginous fluid should be sufficient so that an invert emulsion forms and may be less than about 99% by volume of the invert emulsion. In one embodiment, the amount of oleaginous fluid is from about 30% to about 95% by volume, and about 40% to about 90% by volume of the invert emulsion fluid in other embodiments. The oleaginous fluid, in one embodiment, may include at least 5% by volume of a material selected from the group including esters, ethers, acetals, dialkylcarbonates, hydrocarbons, and combinations thereof.

In some embodiments, the wellbore fluids may include a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the wellbore fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

In some embodiments, the wellbore fluid may be considered an "all-oil" based wellbore fluid. As used herein, "all-oil" refers to the fluid being essentially free of free water. For example, embodiments herein may include a water-absorbing polymer, such as a polyacrylate, to pull residual, entrained, or produced water out of the fluid, binding the water so as to limit the water's ability to interact with the surface-modified silica weighting agents, organoclays, or other additives, minimizing or negating any effect the water may have on the desired properties of the fluid.

Embodiments of the oil-based insulating packer fluids disclosed herein may include a base oil, such as an oleaginous fluid, a silica weighting agent, and an organoclay. The combination of these components may provide for desired suspension properties (i.e., no settling over a test period), as well as sufficient viscosity to prevent convection currents when emplaced in a wellbore and held static for a length of time.

In some embodiments, oil-based insulating packer fluids disclosed herein may include a base oil, such as an oleaginous fluid, a silica weighting agent, a micronized weighting agent, and an organoclay. The use of a micronized weighting agent may be synergistic with the silica weighting agent, enhancing the stability of the suspension.

In other embodiments, oil-based insulating packer fluids disclosed herein may include a base oil, such as an oleaginous fluid, a surface-modified silica weighting agent, and an organoclay. The surface-modification of the silica may provide for stability of the suspension without the need for other additives, although their use is still permitted.

In some embodiments, wellbore fluids according to embodiments disclosed herein may include: an oleaginous base fluid, such as a mineral oil or a diesel oil; a viscosifying and weighting agent, namely a precipitated silica or surface-modified silica weighting agent, present in the range from about 5 to about 40 ppb, such as about 15 ppb to about 22 ppb; and an organoclay, such as sepiolite, attapulgite, and bentonite, present in the range from about 1 to about 10 ppb, such as about 4 ppb to 8 ppb.

In some embodiments, wellbore fluids according to embodiments disclosed herein may include: an oleaginous base fluid, such as a mineral oil or a diesel oil; a silica weighting agent, without a surface modification, present in the range from about 5 to about 40 ppb, such as about 15 ppb to about 22 ppb; a weighting agent, such as a micronized weighting agent, present in an amount within the range from about 2 ppb to about 25 ppb; and an organoclay, such as sepiolite, attapulgite, and bentonite, present in the range from about 1 to about 10 ppb, such as about 4 ppb to 8 ppb.

The above described wellbore fluids may optionally include: an alkalinity control agent, such as lime, present in the range from about 1 to about 3 ppb, such as about 2 ppb; a fluid loss control agent, present in the range from about 0.5 to about 2.5 ppb, such as about 1 ppb; a water absorbing agent, such as a polyacrylate, present in an amount from about 0.05 ppb to about 0.5 ppb, such as about 0.25 ppb; and a wetting agent, such as SUREWET (available from M-I L.L.C.), present in the range from about 1 ppb to about 3 ppb, such as about 2 ppb.

The above-described insulating packer fluids may be used, for example, in heavy oil production, where a high-pressure steam or hot water is injected into the well and the oil reservoir to heat the fluids in the reservoir, causing a thermal expansion of the crude oil, an increase in reservoir pressure and a decrease of the oil's viscosity. Stimulation of a well according to embodiments herein may be performed by preparing an insulating packer fluid including an oleaginous fluid, a silica weighting agent, and an organoclay, pumping the packer fluid into the wellbore, such as into an annulus of the wellbore, and injecting hot water or steam through a pipe extending through the packer fluid.

The oil-based packer fluids disclosed herein may provide desired suspension properties (i.e., no settling over a test period), as well as sufficient viscosity to prevent convection currents when emplaced in a wellbore and held static for a length of time. As such, the insulating packer fluids may protect the well casing from damage, limiting heat transfer through the annulus.

As insulating packer fluids according to embodiments herein may be oil-based or all-oil systems, they may be thermally stable up to temperatures of 525° F. or greater, thus providing less viscosity variation with temperature, sustained viscosity at downhole conditions, and may be reusable after use downhole.

While the use of silica is well known in aqueous-based wellbore fluids, it has been found that precipitated silicas also have a significant impact on the observed viscosity when added to oil-based wellbore fluids, and those having ordinary skill in the art will appreciate that embodiments disclosed herein may be useful in any application where packer fluids may be used.

Annular fluids formulated in accordance with the present disclosure can be used as an insulating packer fluid for temperatures up to 525° F., providing a constant rheological profile even with prolonged heat aging and under high shear conditions. Thus, materials disclosed herein may differ from insulating annular fluids that utilize organic compounds or polymers, which degrade at such extreme conditions and temperatures. In addition, because the rheological profile of the fluids do not change appreciably with high heat or shear, the fluids may also be recaptured and reused for subsequent applications.

Annular fluids in accordance with the present disclosure may also be used in annular regions outside of the casing containing the drill string. For example, in annular fluid formulations having a high weight percentage of silica weighting agent, the viscosity of the fluid may be such that operating or removing the drill string becomes difficult. However, these formulations may be used in annular regions outside of the casing containing the drill string, providing long term thermal insulation without such complications.

Wellbore fluids formulated in accordance with embodiments disclosed herein may be used in stimulation operations. For example, annular fluids formulated with fumed or precipitated silicas in accordance with the embodiments disclosed herein may be useful; in extreme temperature applications such as wellbore stimulation that requires the injection of $CO_2$ at 400° F. into an oil-producing zone without significantly heating or damaging the surrounding formation. Further, the Applicant has discovered that a number of factors affect the ability of precipitated silicas to enhance the viscosity of a wellbore fluid, which may include surface area, pH, particle size, and residual salt composition and concentration.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:
1. A method comprising:
   preparing a packer fluid comprising:
      an oleaginous fluid,
      an organoclay; and
      a silica weighting agent, wherein the silica weighting agent has a BET-5 nitrogen surface area of 20 m²/g to 200 m²/g, as calculated from the surface adsorption of N2 using the BET-1 point method, the silica weighting agent has an average particle size from about 1 microns to about 100 microns, and the silica weighting agent is added to the packer fluid at a concentration of 5 ppb to 40 ppb; and pumping the packer fluid into the annulus of a wellbore.

2. The method of claim 1, wherein the organoclay is one or more selected from a group consisting of sepiolite, attapulgite, and bentonite.

3. The method of claim 1, wherein the oleaginous fluid comprises at least one selected from a group consisting of diesel oil, a mixture of diesel and paraffin oil, mineral oil, and isomerized olefins.

4. The method of claim 1, wherein an average particle diameter of the silica weighting agent is from about 25 microns to about 40 microns.

5. The method of claim 1, wherein the silica weighting agent is a surface-modified silica comprising a lipophilic coating.

6. The method of claim 5, wherein the lipophilic coating comprises at least one of a polysiloxane, an aminoalkylsilane, and an alkoxyorganomercaptosilane.

7. The method of claim 1, wherein the packer fluid is an all-oil packer fluid essentially free of free water.

8. The method of claim 1, wherein the silica weighting agent is a precipitated silica.

9. The method of claim 1, wherein the silica weighting agent is added to the packer fluid at a concentration of 15 ppb to 22 ppb.

10. A method comprising: preparing an packer fluid comprising:
an water-absorbing polymer,
an oleaginous fluid, and
a silica weighting agent,
wherein the silica weighting agent has a BET-5 nitrogen surface area of 20 m²/g to 200 m²/g, as calculated from the surface adsorption of N2 using the BET-1 point method, and
wherein the silica weighting agent has an average particle size from about 1 microns to about 100 microns; and
pumping the packer fluid into the annulus of a wellbore.

11. The method of claim 10, wherein the water-absorbing polymer is a polyacrylate.

12. The method of claim 10, wherein the packer fluid further comprises an organoclay.

13. The method of claim 12, wherein the organoclay is one or more selected from a group consisting of sepiolite, attapulgite, and bentonite.

14. The method of claim 10, wherein the oleaginous fluid comprises at least one selected from a group consisting of diesel oil, a mixture of diesel and paraffin oil, mineral oil, and isomerized olefins.

15. The method of claim 10, wherein an average particle diameter of the silica weighting agent is from about 25 microns to about 40 microns.

16. The method of claim 10, wherein the silica weighting agent is a surface-modified silica comprising a lipophilic coating.

17. The method of claim 16, wherein the lipophilic coating comprises at least one of a polysiloxane, an aminoalkylsilane, and an alkoxyorganomercaptosilane.

18. The method of claim 10, wherein the packer fluid is an all-oil packer fluid essentially free of free water.

19. A method comprising:
preparing a packer fluid comprising:
an oleaginous fluid, and
a silica weighting agent, wherein
the silica weighting agent has a BET-5 nitrogen surface area of 20 m²/g to 200 m²/g, as calculated from the surface adsorption of N2 using the BET-1 point method,
the silica weighting agent has an average particle size from about 1 microns to about 100 microns, and
the silica weighting agent is added to the packer fluid at a concentration of 5 ppb to 40 ppb or is a surface-modified silica comprising a lipophilic coating comprises at least one of a polysiloxane, an aminoalkylsilane, and an alkoxyorganomercaptosilane; and
wherein the packer fluid is an all-oil packer fluid essentially free of free water pumping the packer fluid into the annulus of a wellbore.

* * * * *